Patented Dec. 1, 1931

1,834,783

UNITED STATES PATENT OFFICE

ARNOLD H. JOHNSON, OF BALTIMORE, MARYLAND, ASSIGNOR TO RESEARCH LABORATORIES OF NATIONAL DAIRY PRODUCTS CORP. INC., OF BALTIMORE, MARYLAND, A CORPORATION OF MARYLAND

STERILIZING SOLUTION

No Drawing. Application filed October 17, 1930. Serial No. 489,479.

The present invention relates to sterilizing preparations and more particularly a solution which can be used upon metallic objects without danger of corrosion.

In the dairy industry, for example, the sterilization of equipment is a fundamental requirement and the present invention provides a suitable compound which is thorough in its action and exerts no deleterious effect upon the metallic members of the apparatus.

An object of the invention is to employ in connection with a chlorine containing member, an anti-corrosive agent or compound in the form of a metasilicate of an alkali metal.

I have found that the hypochlorite of an alkali earth metal such as calcium and the metasilicate of an alkali metal such as sodium will react to produce a non-corrosive solution having at the same time the required available chlorine for effective sterilization.

In carrying out the invention calcium hypochlorite and sodium metasilicate are caused to react and form a solution containing sodium hypochlorite and sodium metasilicate both of which are in solution, and a fine flocculant precipitate of calcium silicate. The calcium silicate may be allowed to settle out and may then be removed, but I have found that its presence in no way interferes with the use of the solution for sterilizing purposes and does not induce any corrosive effect.

The solution is rendered alkaline by the sodium metasilicate and in this manner the presence or formation of any free chlorine compounds such as hyochlorous acid is effectively overcome. The metasilicate exerts no corrosive action itself and moreover acts as a buffer member, preventing hydrolysis and hence the formation of corrosive chlorine compounds.

In the sterilizing solution of this invention, wherein the possibility of corrosive chlorine compounds being formed is obviated, I have found that by varying the ratio of available chlorine to the non-corrosive sodium metasilicate, that the preparation of a satisfactory compound may be readily accomplished. I have found that a ratio of available chlorine to sodium metasilicate may vary through a range of from 1 part chlorine to 2 parts metasilicate up to and including 1 part chlorine to 20 parts metasilicate and the solution will be satisfactory for substantially all purposes. In other words, by keeping the chlorine constant and varying the metasilicate within the range specified, the solution will be satisfactory both from the standpoint of sterilizing, strength and particularly from the standpoint of being non-corrosive to metal equipment with which the solution may be employed. This non-corrosive character is due to the fact, as stated, that the sodium metasilicate in solution is itself non-corrosive and exerts the buffer action, above mentioned. Moreover, the presence of the calcium metasilicate precipitate does not in any way affect the sterilizing action or the non-corrosive character of the solution.

The quantities of calcium hypochlorite and sodium metasilicate employed will be determined, so as to give the desired ratios as expressed above and my improved compound may be prepared by any one of the following methods:

1. The two compounds are mixed together in powdered form in the proper proportions and introduced together into an appropriate quantity of water which, if desired, may be diluted by the addition of more water to reduce the concentration.

2. The hypochlorite may be added to an appropriate amount of water and thereafter the metasilicate added and dilution accomplished as required, or vice versa.

3. The proper amount of water having been determined, the hypochlorite may be added thereto and thereafter the metasilicate added without the necessity for dilution, or vice versa.

4. A solution of the metasilicate may be added to an aqueous suspension of hypochlorite and appropriate dilution may take place, if required.

In some cases, particularly where the calcium hypochlorite and sodium metasilicate are obtained from different sources and are not standard and uniform, I have found that the amount of available chlorine may be in excess of that which is required for the final sterilizing non-corrosive preparation, as set forth in the above ratios, and to reduce such excessive chlorine content, I propose to add some soluble inert material such as sodium chloride, sodium sulphate or halogen compounds, such as potassium chloride, or in fact, any inorganic salt which is non-corrosive to metals. This will preferably be added to the dry mixture of hypochlorite and metasilicate described in method 1, in a predetermined amount, as required.

While I have set forth above the use of calcium hypochlorite, it will be understood that any alkali earth metal hypochlorite may be employed and while I have indicated specifically sodium metasilicate, any metasilicate of an alkali metal may be employed.

The principal requirements of such solution are that there be present available chlorine and a sufficient amount of the metasilicate to prevent corrosive action.

The solution of the present invention comprises a sufficient amount of available chlorine to accomplish the desired sterilization in a thoroughly efficient manner and there is always present a concentration of metasilicate which will adjust the pH and act as a buffer to thereby prevent hydrolysis of any chlorine compounds. In this manner, possibility of corrosive action by the chlorine compounds is obviated and since the metasilicate is itself non-corrosive to metals, the solution may be safely used and prepared by unskilled operators. In addition to preventing hydrolysis, I have found that the presence of the alkali metal metasilicate, in the present case sodium metasilicate, exercises a peculiar function and under numerous tests apparently is the member which eliminates corrosive action. Just what chemical phenomena take place, I am not in a position to state definitely, but from numerous experiments and observations, it would appear that while there is no question but what the tendency for hydrolysis to occur is reduced, nevertheless the metasilicate exerts certain other specific effects which prevent corrosion. It is clear that the metasilicate exerts a buffer action, but I have not determined whether it is this phenomenon alone which renders the solution non-corrosive. It is certain that the metasilicate is itself non-corrosive in the concentrations specified and overcomes any tendency of the chlorine to form corrosive compounds.

While I have set forth various methods of preparing the solution in accordance with this invention, I also prepare the compound in other ways.

Thus, I prepare a solution of sodium hypochlorite and add thereto sodium metasilicate in the required ratio. Also, solutions of both of these members may be prepared and mixed in proper ratios.

Again, the chlorine may be introduced as by bubbling into a solution of sodium metasilicate and the chlorine to silicate ratio corrected to the proper value by addition of either chlorine or silicate as required.

The sodium hypochlorite may be prepared in any desired manner or process, but it is necessary to this invention, that metasilicate be present in solution to required amount, as specified.

Referring to the method of forming the compound by producing a dry mixture of calcium hypochlorite and sodium metasilicate, specified as method 1 herein, the mixture will be produced by using sufficient hypochlorite and sufficient metasilicate to obtain a ratio of the range of from 1 part available chlorine to 2 parts metasilicate up to and through 1 part available chlorine to 20 parts metasilicate. For example, calcium hypochlorite powder containing 65% chlorine will be employed in the proportion of $\frac{100}{65}$ parts or pounds of calcium hypochlorite to 20 parts or pounds sodium metasilicate. This will produce in the dry mixture a ratio of available chlorine and metasilicate of 1 to 20. Of course, smaller ratios may be employed and have actually been found satisfactory both from the standpoint of sterilizing, as well as from the non-corrosive characteristic which is desirable. Also, the relationship of 1 to 20 may well be exceeded, although it has been found preferable to keep the variation in the ratios within the limits given.

I claim:

1. A non-corrosive sterilizing compound comprising an alkali metal metasilicate and available chlorine.

2. A non-corrosive sterilizing compound comprising an alkali metal metasilicate and available chlorine, the metasilicate being non-corrosive to metals and present in sufficient concentration to prevent the formation of corrosive chlorine compounds.

3. A non-corrosive sterilizing solution comprising sodium metasilicate and available chlorine.

4. A non-corrosive sterilizing solution comprising sodium metasilicate and available chlorine, the metasilicate being non-corrosive to metals and present in sufficient concentration to prevent the formation of corrosive chlorine compounds.

5. A non-corrosive sterilizing solution comprising sodium metasilicate and sodium hypochlorite.

6. A non-corrosive sterilizing solution comprising sodium metasilicate and sodium hypochlorite, the metasilicate being non-corrosive to metals and present in sufficient concentration to prevent the formation of corrosive chlorine compounds.

7. A mixture for forming a non-corrosive sterilizing solution having available chlorine in the presence of an alkali metal metasilicate, comprising an alkali earth metal hypochlorite and an alkali metal metasilicate.

8. A mixture for forming a non-corrosive sterilizing solution having available chlorine in the presence of an alkali metal metasilicate, comprising calcium hypochlorite and a sodium metasilicate.

9. A mixture for forming a non-corrosive sterilizing solution having available chlorine in the presence of an alkali metal metasilicate, comprising an alkali earth metal hypochlorite and an alkali metal metasilicate, the ratio of available chlorine to the metasilicate being in a range of from one part available chlorine to two parts metasilicate through one part chlorine to twenty parts metasilicate.

10. A mixture for forming a non-corrosive sterilizing solution having available chlorine in the presence of an alkali metal metasilicate, comprising calcium hypochlorite and a sodium metasilicate, the ratio of available chlorine to the metasilicate being in a range of from one part available chlorine to two parts metasilicate through one part chlorine to twenty parts metasilicate.

11. A non-corrosive sterilizing compound comprising an alkali metal metasilicate and available chlorine, the ratio of available chlorine to the metasilicate being in a range of from one part available chlorine to two parts metasilicate through one part chlorine to twenty parts metasilicate.

12. A non-corrosive sterilizing solution comprising sodium metasilicate and sodium hypochlorite, the ratio of available chlorine to the metasilicate being in a range of from one part available chlorine to two parts metasilicate through one part chlorine to twenty parts metasilicate.

13. The process of forming a non-corrosive sterilizing solution which comprises reacting upon an alkali earth metal hypochorite with an alkali metal metasilicate to produce a solution containing an alkali metal metasilicate and available chlorine.

14. The process of forming a non-corrosive sterilizing solution which comprises reacting upon the calcium hypochlorite with sodium metasilicate to produce a solution containing sodium metasilicate and sodium hypochlorite.

15. The process of forming a non-corrosive sterilizing solution which comprises reacting upon an alkali earth metal hypochlorite with an alkali metal metasilicate to produce a solution containing an alkali metal metasilicate and available chlorine, the ratio of available chlorine to metasilicate being in a range of from 1 part available chlorine to 2 parts metasilicate up to and through 1 part available chlorine to 20 parts metasilicate.

16. The process of forming a non-corrosive sterilizing solution which comprises reacting upon the calcium hypochlorite with sodium metasilicate to produce a solution containing sodium metasilicate and sodium hypochlorite, the ratio of available chlorine to metasilicate being in a range of from 1 part available chlorine to 2 parts metasilicate up to and through 1 part available chlorine to 20 parts metasilicate.

In testimony whereof I have hereunto set my hand.

ARNOLD H. JOHNSON.